(12) United States Patent
Xue et al.

(10) Patent No.: US 10,160,051 B2
(45) Date of Patent: Dec. 25, 2018

(54) FERRULE TYPE WHEEL DEBURRING DEVICE

(71) Applicant: CITIC Dicastal CO., LTD., Qinhuangdao, Hebei (CN)

(72) Inventors: Bowen Xue, Qinhuangdao (CN); Jiandong Guo, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 0 days.

(21) Appl. No.: 15/603,607

(22) Filed: May 24, 2017

(65) Prior Publication Data

US 2017/0348781 A1 Dec. 7, 2017

(30) Foreign Application Priority Data

Jun. 1, 2016 (CN) .......................... 2016 1 0381207

(51) Int. Cl.
*B24B 9/04* (2006.01)
*B23D 79/04* (2006.01)
*B23D 79/02* (2006.01)

(52) U.S. Cl.
CPC ................ *B23D 79/04* (2013.01); *B24B 9/04* (2013.01); *B23D 79/021* (2013.01)

(58) Field of Classification Search
CPC ............ B24B 9/04; B24B 19/00; B24B 29/00
See application file for complete search history.

(56) References Cited

U.S. PATENT DOCUMENTS 9,839,992 B2 * 12/2017 Xue ........................ B24D 13/10

FOREIGN PATENT DOCUMENTS

| CN | 103481215 A | 1/2014 |
| CN | 203438030 U | 2/2014 |
| CN | 205630192 U | 10/2016 |
| JP | H08252753 A | 10/1996 |
| JP | 2006218601 A | 8/2006 |

* cited by examiner

*Primary Examiner* — Michael Jennings
(74) *Attorney, Agent, or Firm* — Syncoda LLC; Feng Ma; Junjie Feng

(57) ABSTRACT

Disclosed is a ferrule type wheel deburring device, which includes a machine frame, cylinders, motors, clamp units, a brush, guide posts, guide sleeves, etc. According to the ferrule type wheel deburring device, when in use, the size of a lower brush can be automatically adjusted according to the diameter of a wheel, and burrs of all places of a front surface of the wheel can be effectively removed; and meanwhile, the ferrule type wheel deburring device has the characteristics of advanced technology, high degree of automation, high universality and safe and stable performance.

2 Claims, 4 Drawing Sheets

FERRULE TYPE WHEEL DEBURRING DEVICE

CROSS-REFERENCE TO RELATED APPLICATIONS

This application is filed based upon and claims priority to Chinese Patent Application No. 201610381207.7, filed on Jun. 1, 2016, the entire contents of which are incorporated herein by reference.

TECHNICAL FIELD

The disclosure relates to a deburring device, and in particular to a size-adjustable ferrule type wheel deburring device.

BACKGROUND

A deburring procedure is a very important procedure of an aluminum-alloy wheel production process, and the painting effect of a follow-up procedure will be directly affected if burrs are not cleanly removed. At present, all wheel production enterprises use specialized equipment to drive burr brushes to carry out burr brushing treatment on wheels. Almost all aluminum-alloy wheel production enterprises adopt mixed-line production, i.e., wheels of different sizes simultaneously flow on various working procedures of a production line. Aiming at this condition, the mixed-line production has very high requirements on universality of the equipment, and the production efficiency will be seriously affected if the requirements are not met.

SUMMARY

An object of the disclosure is to a wheel deburring device, of which the size of a brush can be quickly adjusted according to the size of a wheel.

In order to achieve the object described above, a technical solution of the disclosure is as follows: a ferrule type wheel deburring device is composed of a machine frame, first cylinders, first guide posts, a second guide post, second cylinders, a first motor, first guide sleeves, a lower rising and falling plate, second guide sleeves, a first support ring, first pneumatic chucks, a first bearing block, a first shaft, a second support ring, second pneumatic chucks, a guide rail, a servo electric cylinder, a bracket, rollers, a first belt pulley, a synchronizing belt, second belt pulleys, a second motor, a third motor, a profiling roller brush, an upper mounting frame, a second shaft, a second bearing block, an upper rising and falling plate, a fourth motor, third guide posts, third guide sleeves, third cylinders, a lower brush, a fourth guide post, fourth guide sleeves and fourth cylinders. Four first guide posts are fixed between a bottom plate of the machine frame and a working platform; four first guide sleeves matched with the first guide posts are fixed on the lower rising and falling plate; four second guide sleeves and four fourth guide sleeves are simultaneously fixed on the lower rising and falling plate and are distributed on different pitch circles; two second cylinders and two fourth cylinders are mounted below the lower rising and falling plate; output ends of the second cylinders are hinged to the downside of the second support ring, and output ends of the fourth cylinders are hinged to the downside of the first support ring; two first cylinders are mounted on the bottom plate of the machine frame, and output ends of the first cylinders are hinged to the downside of the lower rising and falling plate; the first bearing block is mounted above the lower rising and falling plate, and the first shaft is mounted inside the first bearing block through a bearing; the lower brush is mounted at the upside of the first shaft, and the downside of the first shaft is connected with an output end of the first motor which is fixed below the lower rising and falling plate; and four first pneumatic chucks are mounted above the first support ring in a uniform distribution manner, and four second pneumatic chucks are mounted above the second support ring in a uniform distribution manner.

A clamp unit is as follows: a sliding block of the guide rail is fixed above a platform of the machine frame, a slide rail is mounted below the bracket, the servo electric cylinder is mounted at one side of the bracket, and an output end of the servo electric cylinder is connected with a sidewall of the machine frame; the upper and lower ends of each of the two rollers are mounted in the bracket through bearings; the second belt pulleys are separately mounted above the two rollers; the second motor is mounted above the bracket, and the first belt pulley is mounted at an output end of the second motor; the first belt pulley and the second belt pulleys are connected through the synchronizing belt; and the device includes two clamp units, i.e., a left clamp unit and a right clamp unit.

The left and right ends of the profiling roller brush are mounted in the upper mounting frame through bearings; the third motor is fixed at one side of the upper mounting frame, and an output end of the third motor is connected with one end of the profiling roller brush; the second bearing block is fixed below the upper rising and falling plate, and the second shaft is mounted in the second bearing block through a bearing; the fourth motor is fixed above the upper rising and falling plate, and an output end of the fourth motor is connected with the upside of the second shaft; four third guide posts are fixed above the upper rising and falling plate, and four third guide sleeves matched with the third guide posts are fixed on a top plate of the machine frame; and two third cylinders are also fixed on the top plate of the machine frame, and output ends of two third cylinders are hinged to the upside of the upper rising and falling plate.

The lower brush is composed of first blind rivets, first ferrules, iron sheets, second blind rivets, first strong magnets, second ferrules, second strong magnets, a central brush and T-shaped blocks; the first blind rivets are fixed below the first ferrules, and four T-shaped blocks are fixed at inner sides of the first ferrules; the iron sheets are separately fixed above the T-shaped blocks; the second blind rivets are fixed below the second ferrules, and four T-shaped blocks are fixed at inner sides of the second ferrules; the first strong magnets are fixed in T-shaped grooves in downsides of the second ferrules, and positions of the first strong magnets correspond to the iron sheets above the T-shaped blocks on the first ferrules; and the second strong magnets are fixed in T-shaped grooves in the downside of the central brush, and positions of the second strong magnets correspond to the iron sheets above the T-shaped blocks on the second ferrules.

During actual use, the servo electric cylinders are used for adjusting positions of the left and right four rollers according to the diameter of the wheel and clamping the wheel, and the second motors enable the clamped wheel to rotate; the third cylinders enable the upper rising and falling plate and the profiling roller brush to fall and be in contact with a front surface of the wheel through the third guide posts, the fourth motor enables the profiling roller brush to rotate through the second shaft in a manner that a direction of rotation of the profiling roller brush is opposite to that of the wheel, and meanwhile, the third motor drives the profiling roller brush to self-rotate; the second pneumatic chucks are used for clamping the second blind rivets, the second ferrules are enabled to be combined with the central brush through the second cylinders and the fourth guide post, the iron sheets on the second ferrules are attracted by the second strong magnets, and the T-shaped blocks on the second ferrules are fit with the T-shaped grooves in the central brush; the first pneumatic chucks are used for clamping the first blind rivets, the first ferrules are enabled to be combined with the second ferrules through the fourth cylinders and the second guide post, the iron sheets on the first ferrules are attracted by the first strong magnets, and the T-shaped blocks on the first ferrules are fit with the T-shaped grooves in the second ferrules; and the central brush is combined with the first ferrules and the second ferrules according to the diameter of the wheel.

According to the ferrule type wheel deburring device, when in use, the size of a lower brush can be automatically adjusted according to the diameter of the wheel, and burrs of all places of the front surface of the wheel can be effectively removed; and meanwhile, the ferrule type wheel deburring device has the characteristics of advanced technology, high degree of automation, high universality and safe and stable performance.

Figure 1:
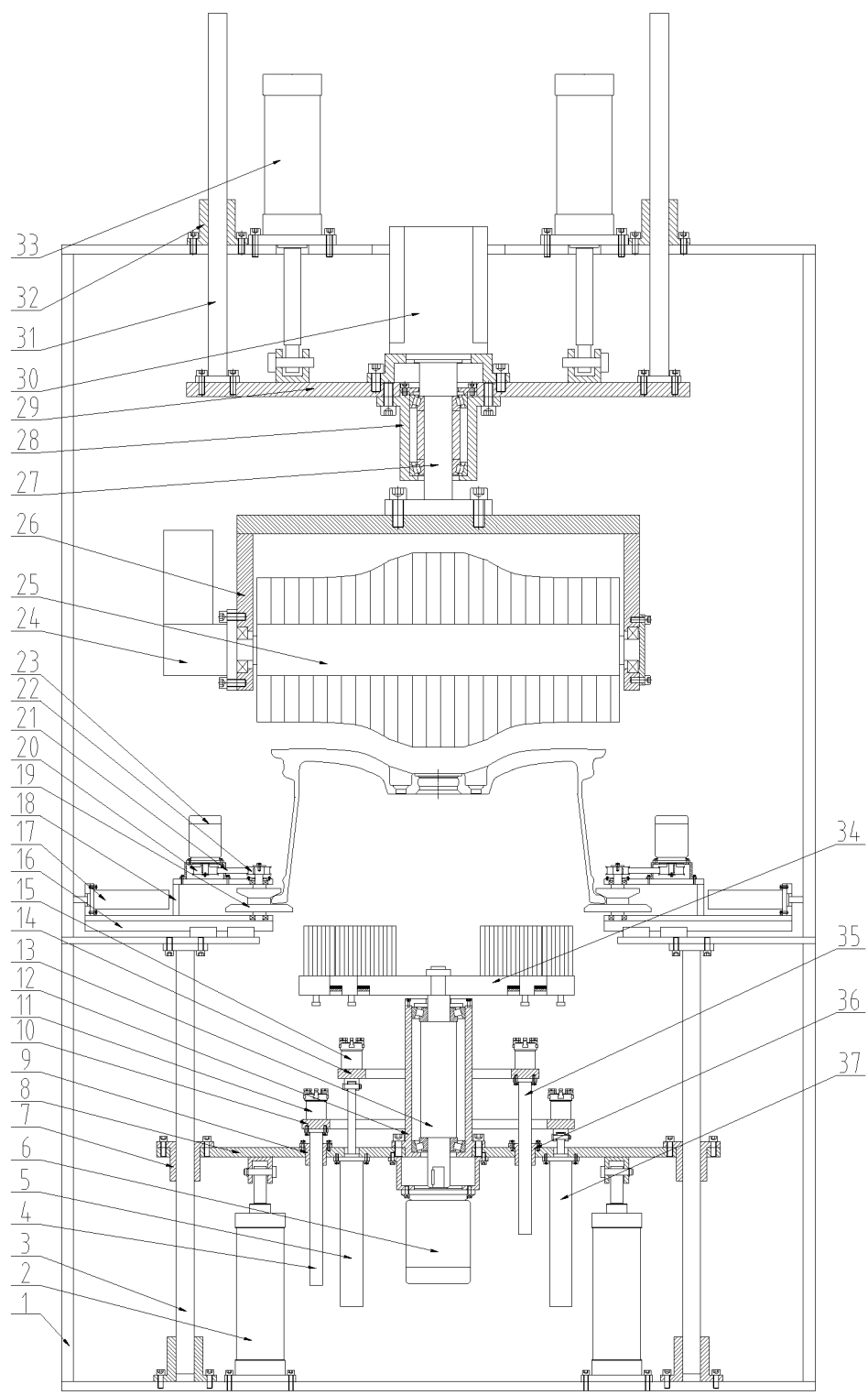
FIG. 1 is a front view of a ferrule type wheel deburring device.
Figure 2:
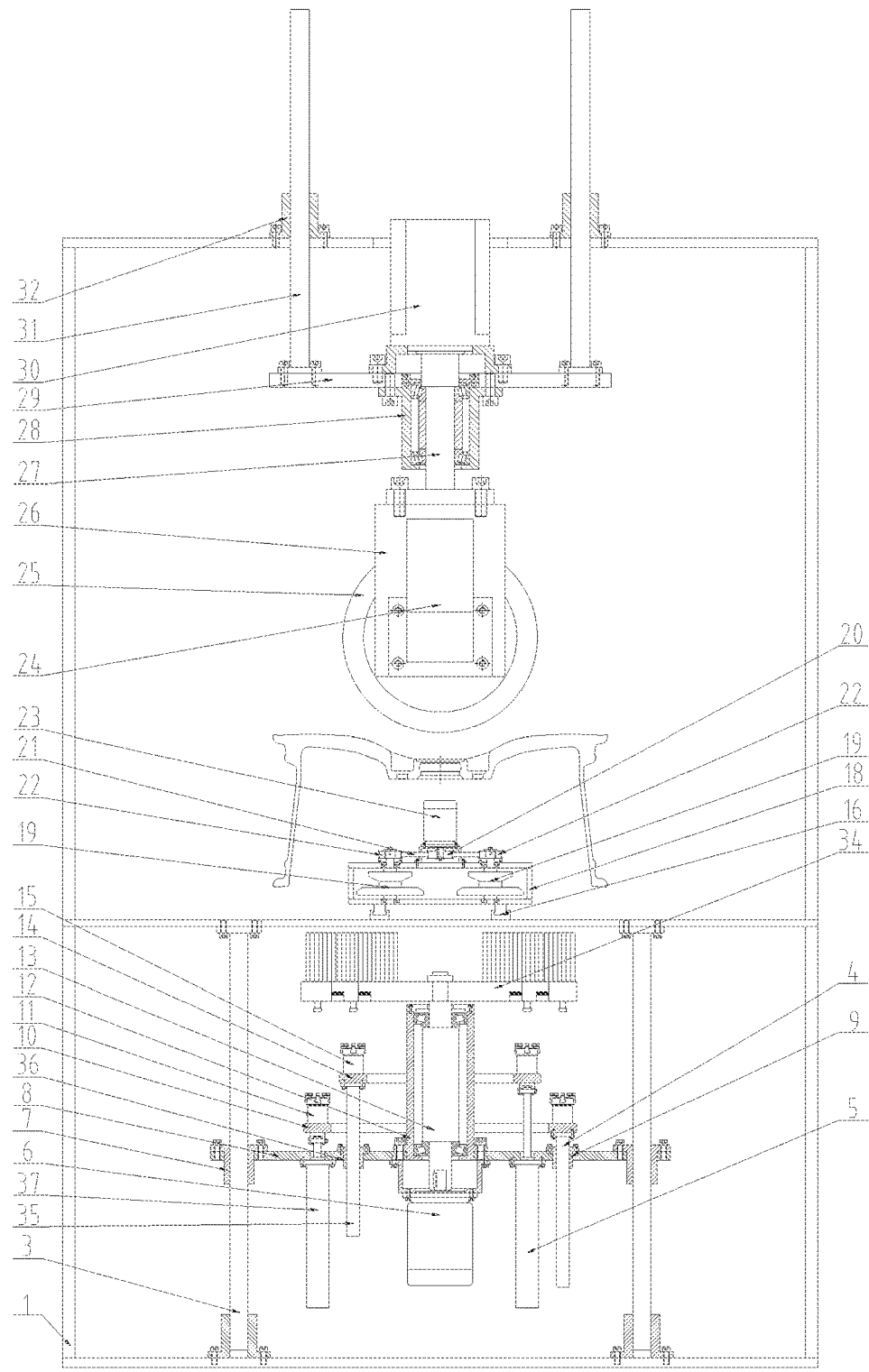
FIG. 2 is a left view of a ferrule type wheel deburring device.
Figure 3:
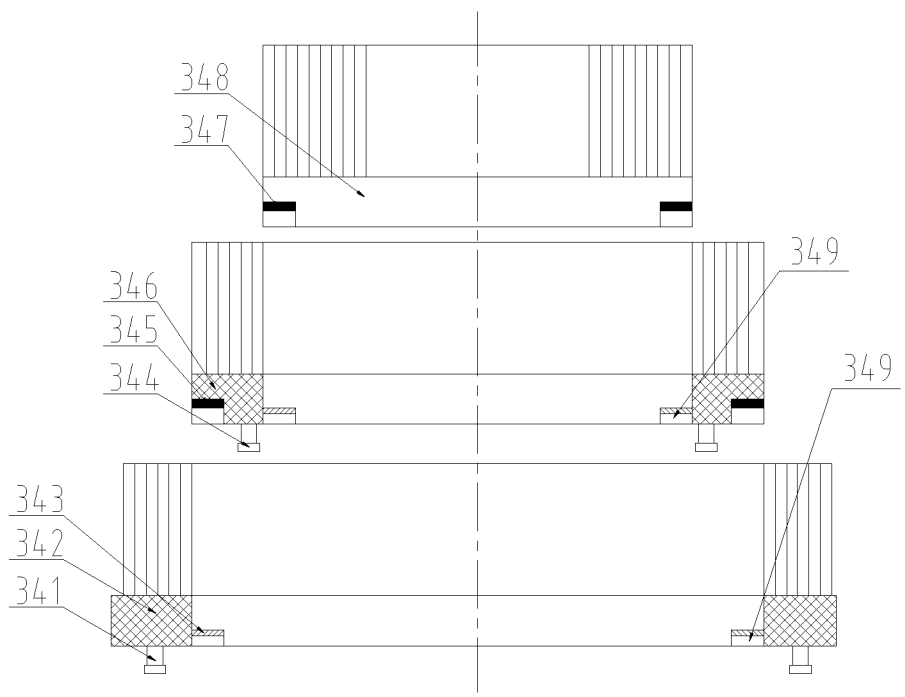
FIG. 3 is an exploded front view of a lower brush of a ferrule type wheel deburring device.
Figure 4:
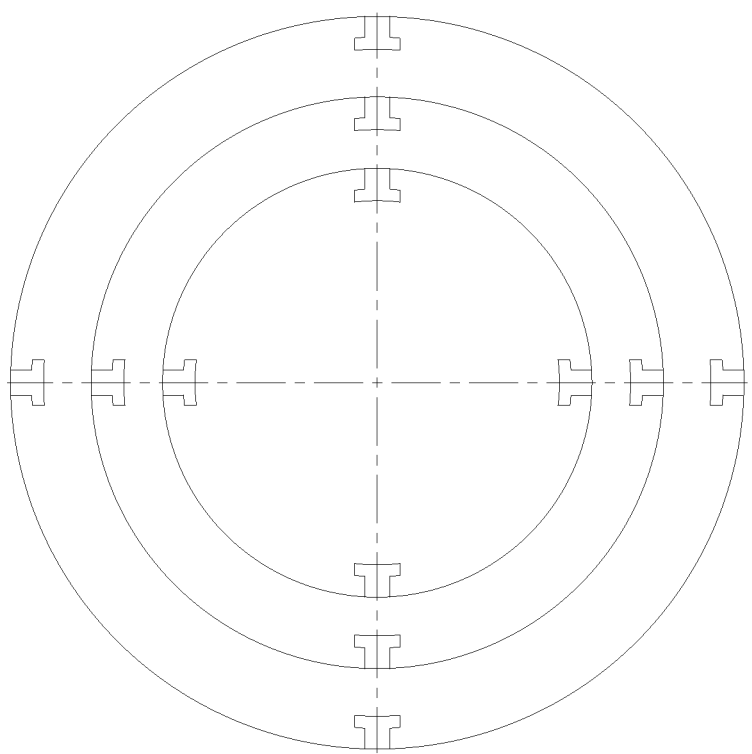
FIG. 4 is a top view of a lower brush of an improved deburring device for a back cavity of a wheel.

LIST OF REFERENCE NUMERALS 1 machine frame
2 first cylinder
3 first guide post
4 second guide post
5 second cylinder
6 first motor
7 first guide sleeve
8 lower rising and falling plate
9 second guide sleeve
10 first support ring
11 first pneumatic chuck
12 first bearing block
13 first shaft
14 second support ring
15 second pneumatic chuck
16 guide rail
17 servo electric cylinder
18 bracket
19 roller
20 first belt pulley
21 synchronizing belt
22 second belt pulley
23 second motor
24 third motor
25 profiling roller brush
26 upper mounting frame
27 second shaft
28 second bearing block
29 upper rising and falling plate
30 fourth motor
31 third guide post
32 third guide sleeve
33 third cylinder
34 lower brush
35 fourth guide post
36 fourth guide sleeve
37 fourth cylinder
341 first blind rivet
342 first ferrule
343 iron sheet
344 second blind rivet
345 first strong magnet
346 second ferrule
347 second strong magnet
348 central brush
349 T-shaped block

DETAILED DESCRIPTION

In the following, the details and working conditions of a specific device provided by the disclosure are described in combination with the figures.

The ferrule type wheel deburring device is composed of a machine frame 1, first cylinders 2, first guide posts 3, a second guide post 4, second cylinders 5, a first motor 6, first guide sleeves 7, a lower rising and falling plate 8, second guide sleeves 9, a first support ring 10, first pneumatic chucks 11, a first bearing block 12, a first shaft 13, a second support ring 14, second pneumatic chucks 15, a guide rail 16, a servo electric cylinder 17, a bracket 18, rollers 19, a first belt pulley 20, a synchronizing belt 21, second belt pulleys 22, a second motor 23, a third motor 24, a profiling roller brush 25, an upper mounting frame 26, a second shaft 27, a second bearing block 28, an upper rising and falling plate 29, a fourth motor 30, third guide posts 31, third guide sleeves 32, third cylinders 33, a lower brush 34, a fourth guide post 35, fourth guide sleeves 36 and fourth cylinders 37; four first guide posts 3 are fixed between a bottom plate of the machine frame 1 and a working platform; four first guide sleeves 7 matched with the first guide posts 3 are fixed on the lower rising and falling plate 8; four second guide sleeves 9 and four fourth guide sleeves 36 are simultaneously fixed on the lower rising and falling plate 8 and are distributed on different pitch circles; two second cylinders 5 and two fourth cylinders 37 are mounted below the lower rising and falling plate 8; output ends of the second cylinders 5 are hinged to the downside of the second support ring 14, and output ends of the fourth cylinders 37 are hinged to the downside of the first support ring 10; two first cylinders 2 are mounted on the bottom plate of the machine frame 1, and output ends of the first cylinders 2 are hinged to the downside of the lower rising and falling plate 8; the first bearing block 12 is mounted above the lower rising and falling plate 8, and the first shaft 13 is mounted inside the first bearing block 12 through a bearing; the lower brush 34 is mounted at the upside of the first shaft 13, and the downside of the first shaft 13 is connected with an output end of the first motor 6 which is fixed below the lower rising and falling plate 8; and four first pneumatic chucks 11 are mounted above the first support ring 10 in a uniform distribution manner, and four second pneumatic chucks 15 are mounted above the second support ring 14 in a uniform distribution manner.

A clamp unit is as follows: a sliding block of the guide rail 16 is fixed above a platform of the machine frame 1, a slide rail is mounted below the bracket 18, the servo electric cylinder 17 is mounted at one side of the bracket 18, and an output end of the servo electric cylinder 17 is connected with a sidewall of the machine frame 1; the upper and lower ends of each of the two rollers 19 are mounted in the bracket 18 through bearings; the second belt pulleys 22 are separately mounted above the two rollers 19; the second motor 23 is mounted above the bracket 18, and the first belt pulley 20 is mounted at an output end of the second motor 23; the first belt pulley 20 and the second belt pulleys 22 are connected through the synchronizing belt 21; and the device includes two clamp units, i.e., a left clamp unit and a right clamp unit.

A profile of the profiling roller brush 25 is determined according to the shape of a front surface of a wheel, and the left and right ends of the profiling roller brush 25 are mounted in the upper mounting frame 26 through bearings; the third motor 24 is fixed at one side of the upper mounting frame 26, and an output end of the third motor 24 is connected with one end of the profiling roller brush 25; the second bearing block 28 is fixed below the upper rising and falling plate 29, and the second shaft 27 is mounted in the second bearing block 28 through a bearing; the fourth motor 30 is fixed above the upper rising and falling plate 29, and an output end of the fourth motor 30 is connected with the upside of the second shaft 27; four third guide posts 31 are fixed above the upper rising and falling plate 29, and four third guide sleeves 32 matched with the third guide posts 31 are fixed on a top plate of the machine frame 1; and two third cylinders 33 are also fixed on the top plate of the machine frame 1, and output ends of the two third cylinders 33 are hinged to the upside of the upper rising and falling plate 29.

The lower brush 34 is composed of first blind rivets 341, first ferrules 342, iron sheets 343, second blind rivets 344, first strong magnets 345, second ferrules 346, second strong magnets 347, a central brush 348 and T-shaped blocks 349, the first blind rivets 341 are fixed below the first ferrules 342, and four T-shaped blocks 349 are fixed at inner sides of the first ferrules 342; the iron sheets 343 are separately fixed above the T-shaped blocks 349; the second blind rivets 344 are fixed below the second ferrules 346, and four T-shaped blocks 349 are fixed at inner sides of the second ferrules 346; the first strong magnets 345 are fixed in T-shaped grooves in downsides of the second ferrules 346, and positions of the first strong magnets 345 correspond to the iron sheets 343 above the T-shaped blocks 349 on the first ferrules 342; and the second strong magnets 347 are fixed in T-shaped grooves in the downside of the central brush 348, and positions of the second strong magnets 347 correspond to the iron sheets 343 above the T-shaped blocks 349 on the second ferrules 346.

During work, the servo electric cylinders 17 are used for adjusting positions of the left and right four rollers 19 according to the diameter of the wheel and clamping the wheel, and the second motors 23 enable the clamped wheel to rotate; the third cylinders 33 enable the upper rising and falling plate 29 and the profiling roller brush 25 to fall and be in contact with the front surface of the wheel through the third guide posts 31, the fourth motor 30 enables the profiling roller brush 25 to rotate through the second shaft 27 in a manner that a direction of rotation of the profiling roller brush 25 is opposite to that of the wheel, and meanwhile, the third motor 24 drives the profiling roller brush 25 to self-rotate; the second pneumatic chucks 15 are used for clamping the second blind rivets 344, the second ferrules 346 are enabled to be combined with the central brush 348 through the second cylinders 5 and the fourth guide post 35, the iron sheets 343 on the second ferrules 346 are attracted by the second strong magnets 347, and the T-shaped blocks 349 on the second ferrules 346 are fit with the T-shaped grooves in the central brush 348; the first pneumatic chucks 11 are used for clamping the first blind rivets 341, the first ferrules 342 are enabled to be combined with the second ferrules 346 through the fourth cylinders 37 and the second guide post 4, the iron sheets 343 on the first ferrules 342 are attracted by the first strong magnets 345, and the T-shaped blocks 349 on the first ferrules 342 are fit with the T-shaped grooves in the second ferrules 346; and the central brush 348 is combined with the first ferrules 342 and the second ferrules 346 according to the diameter of the wheel.

The invention claimed is:

1. A ferrule type wheel deburring device, being composed of a machine frame (1), first cylinders (2), first guide posts (3), a second guide post (4), second cylinders (5), a first motor (6), first guide sleeves (7), a lower rising and falling plate (8), second guide sleeves (9), a first support ring (10), first pneumatic chucks (11), a first bearing block (12), a first shaft (13), a second support ring (14), second pneumatic chucks (15), a guide rail (16), a servo electric cylinder (17), a bracket (18), rollers (19), a first belt pulley (20), a synchronizing belt (21), second belt pulleys (22), a second motor (23), a third motor (24), a profiling roller brush (25), an upper mounting frame (26), a second shaft (27), a second bearing block (28), an upper rising and falling plate (29), a fourth motor (30), third guide posts (31), third guide sleeves (32), third cylinders (33), a lower brush (34), a fourth guide post (35), fourth guide sleeves (36) and fourth cylinders (37); characterized in that, four first guide posts (3) are fixed between a bottom plate of the machine frame (1) and a working platform; four first guide sleeves (7) matched with the first guide posts (3) being fixed on the lower rising and falling plate (8); four second guide sleeves (9) and four fourth guide sleeves (36) being simultaneously fixed on the lower rising and falling plate (8) and being distributed on different pitch circles; two second cylinders (5) and two fourth cylinders (37) being mounted below the lower rising and falling plate (8); output ends of the second cylinders (5) being hinged to the downside of the second support ring (14), and output ends of the fourth cylinders (37) being hinged to the downside of the first support ring (10); two first cylinders (2) being mounted on the bottom plate of the machine frame (1), and output ends of the first cylinders (2) being hinged to the downside of the lower rising and falling plate (8); the first bearing block (12) being mounted above the lower rising and falling plate (8), and the first shaft (13) being mounted inside the first bearing block (12) through a bearing; the lower brush (34) being mounted at the upside of the first shaft (13), and the downside of the first shaft (13) being connected with an output end of the first motor (6) which is fixed below the lower rising and falling plate (8); and four first pneumatic chucks (11) being mounted above the first support ring (10) in a uniform distribution manner, and four second pneumatic chucks (15) being mounted above the second support ring (14) in a uniform distribution manner;

a clamp unit being as follows: a sliding block of the guide rail (16) being fixed above a platform of the machine frame (1), a slide rail being mounted below the bracket (18), the servo electric cylinder (17) being mounted at one side of the bracket (18), and an output end of the servo electric cylinder (17) being connected with a sidewall of the machine frame (1); the upper and lower ends of each of the two rollers (19) being mounted in the bracket (18) through bearings; the second belt pulleys (22) being separately mounted above the two rollers (19); the second motor (23) being mounted above the bracket (18), and the first belt pulley (20)

being mounted at an output end of the second motor (23); the first belt pulley (20) and the second belt pulleys (22) being connected through the synchronizing belt (21); and the device comprising two clamp units, i.e., a left clamp unit and a right clamp unit;

the left and right ends of the profiling roller brush (25) being mounted in the upper mounting frame (26) through bearings; the third motor (24) being fixed at one side of the upper mounting frame (26), and an output end of the third motor (24) being connected with one end of the profiling roller brush (25); the second bearing block (28) being fixed below the upper rising and falling plate (29), and the second shaft (27) being mounted in the second bearing block (28) through a bearing; the fourth motor (30) being fixed above the upper rising and falling plate (29), and an output end of the fourth motor (30) being connected with the upside of the second shaft (27); four third guide posts (31) being fixed above the upper rising and falling plate (29), and four third guide sleeves (32) matched with the third guide posts (31) being fixed on a top plate of the machine frame (1); and two third cylinders (33) being also fixed on the top plate of the machine frame (1), and output ends of the two third cylinders (33) being hinged to the upside of the upper rising and falling plate (29).

2. The ferrule type wheel deburring device according to claim 1, wherein the lower brush (34) is composed of first blind rivets (341), first ferrules (342), iron sheets (343), second blind rivets (344), first strong magnets (345), second ferrules (346), second strong magnets (347), a central brush (348) and T-shaped blocks (349), characterized in that, the first blind rivets (341) are fixed below the first ferrules (342), and four T-shaped blocks (349) are fixed at inner sides of the first ferrules (342); the iron sheets (343) are separately fixed above the T-shaped blocks (349); the second blind rivets (344) are fixed below the second ferrules (346), and four T-shaped blocks (349) are fixed at inner sides of the second ferrules (346); the first strong magnets (345) are fixed in T-shaped grooves in downsides of the second ferrules (346), and positions of the first strong magnets (345) correspond to the iron sheets (343) above the T-shaped blocks (349) on the first ferrules (342); and the second strong magnets (347) are fixed in T-shaped grooves in the downside of the central brush (348), and positions of the second strong magnets (347) correspond to the iron sheets (343) above the T-shaped blocks (349) on the second ferrules (346).

* * * * *